United States Patent
Tseng et al.

(10) Patent No.: US 9,830,362 B2
(45) Date of Patent: *Nov. 28, 2017

(54) TECHNIQUES FOR RANKING CHARACTER SEARCHES

(71) Applicant: Facebook, Inc., Menlo Park, CA (US)

(72) Inventors: Kuan-Yu Tseng, Urbana, IL (US); Lin-Shun Huang, Cupertino, CA (US); Yueh-Hsuan Chiang, Madison, WI (US); Chun-Yang Chen, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/570,146

(22) Filed: Dec. 15, 2014

(65) Prior Publication Data
US 2015/0112977 A1 Apr. 23, 2015

Related U.S. Application Data

(63) Continuation of application No. 13/781,150, filed on Feb. 28, 2013, now Pat. No. 9,195,716.

(51) Int. Cl.
G06F 17/30 (2006.01)

(52) U.S. Cl.
CPC .... *G06F 17/3053* (2013.01); *G06F 17/30864* (2013.01); *G06F 17/30616* (2013.01)

(58) Field of Classification Search
CPC .......... G06F 17/3053; G06F 17/30864; G06F 17/30887

USPC .............. 707/723, 735, 748, 756, 758, 602; 709/201, 203, 213, 217

See application file for complete search history.

(56) References Cited

U.S. PATENT DOCUMENTS

| | | | | |
|---|---|---|---|---|
| 5,615,378 | A | * | 3/1997 | Nishino ............... G06F 17/2795 704/4 |
| 6,526,440 | B1 | * | 2/2003 | Bharat ............... G06F 17/30864 707/999.003 |
| 6,546,388 | B1 | * | 4/2003 | Edlund ............. G06F 17/30864 |
| 6,879,951 | B1 | * | 4/2005 | Kuo ........................ G10L 13/08 704/1 |
| 7,199,729 | B2 | * | 4/2007 | Chen ................... G06F 17/2264 341/50 |

(Continued)

FOREIGN PATENT DOCUMENTS

EP 2056219 A1 * 5/2009 ....... G06F 17/30427

*Primary Examiner* — Frantz Coby

(57) ABSTRACT

Techniques for asynchronous rendering are described. An apparatus may comprise a character set converter application, an index server, and a ranking application. The character set converter application may receive a search string comprised of one or more first character set characters, and convert the search string to one or more second character set characters that are different than the first character set. The index server may execute a search on the converted search string to obtain ranked individual search results. The ranking application may compare any first character set characters in the ranked individual search results to the first character set characters in the search string and sub-rank the ranked individual search results based on the strength of any matches. Other embodiments are described and claimed.

21 Claims, 13 Drawing Sheets

(56) References Cited

U.S. PATENT DOCUMENTS

| | | | | |
|---|---|---|---|---|
| 7,516,062 B2* | 4/2009 | Chen | G06F 17/2223 | |
| | | | 704/2 | |
| 7,756,859 B2* | 7/2010 | Simonyi | G06F 17/30985 | |
| | | | 707/718 | |
| 7,818,315 B2* | 10/2010 | Cucerzan | G06F 17/30864 | |
| | | | 707/723 | |
| 7,917,351 B2* | 3/2011 | Chen | G06F 17/2223 | |
| | | | 704/2 | |
| 7,970,791 B2* | 6/2011 | Liao | G06F 21/6227 | |
| | | | 707/791 | |
| 8,521,539 B1* | 8/2013 | Teng | G01C 21/3608 | |
| | | | 701/418 | |
| 8,738,641 B2* | 5/2014 | Hu | G06F 17/30675 | |
| | | | 705/26.61 | |
| 8,775,437 B2* | 7/2014 | Weitz | G06F 17/30864 | |
| | | | 707/748 | |
| 8,909,637 B2* | 12/2014 | Patterson | G06F 17/30867 | |
| | | | 707/706 | |
| 8,977,624 B2* | 3/2015 | Song | G06F 17/30887 | |
| | | | 707/741 | |
| 9,037,999 B2* | 5/2015 | Poniatowski | G06F 3/0482 | |
| | | | 715/716 | |
| 9,177,057 B2* | 11/2015 | Vadlamani | G06F 17/30864 | |
| 9,195,716 B2* | 11/2015 | Tseng | G06F 17/3053 | |
| 9,495,462 B2* | 11/2016 | Poznanski | G06F 17/30867 | |
| 2002/0022953 A1* | 2/2002 | Bertolus | G06F 17/2217 | |
| | | | 704/1 | |
| 2005/0010391 A1* | 1/2005 | Chen | G06F 17/2863 | |
| | | | 704/8 | |
| 2005/0122537 A1* | 6/2005 | Shin | G10L 13/00 | |
| | | | 358/1.13 | |
| 2006/0031207 A1* | 2/2006 | Bjarnestam | G06F 17/277 | |
| 2007/0021956 A1* | 1/2007 | Qu | G06F 17/2223 | |
| | | | 704/8 | |
| 2007/0075879 A1* | 4/2007 | Salwan | G06F 17/2264 | |
| | | | 341/51 | |
| 2008/0260264 A1* | 10/2008 | Miura | G06F 17/211 | |
| | | | 382/226 | |
| 2008/0312901 A1* | 12/2008 | Torii | G06F 3/0237 | |
| | | | 704/2 | |
| 2009/0043741 A1* | 2/2009 | Kim | G06F 17/3064 | |
| 2011/0258212 A1* | 10/2011 | Lu | G06F 17/30864 | |
| | | | 707/760 | |
| 2012/0054192 A1* | 3/2012 | Song | G06F 17/30887 | |
| | | | 707/741 | |
| 2012/0226682 A1* | 9/2012 | Li | G06F 17/30867 | |
| | | | 707/723 | |
| 2013/0024448 A1* | 1/2013 | Herbrich | G06F 17/30864 | |
| | | | 707/728 | |
| 2013/0204864 A1* | 8/2013 | Matsuo | G06Q 30/02 | |
| | | | 707/722 | |
| 2014/0250115 A1* | 9/2014 | Yang | G06F 17/3053 | |
| | | | 707/728 | |
| 2015/0066981 A1* | 3/2015 | Brundage | G06F 17/30887 | |
| | | | 707/769 | |

\* cited by examiner

100

500

600

800

900

1200

TECHNIQUES FOR RANKING CHARACTER SEARCHES

CROSS-REFERENCE TO RELATED APPLICATIONS

The present application claims the benefit of U.S. patent application Ser. No. 13/781,150, entitled "Techniques for Ranking Character Searches" and filed Feb. 28, 2013, which is specifically incorporated by reference in its entirety.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for providing more relevant search results when searching using a character set different from a search database character set. In one embodiment, for example, an apparatus may comprise a character set converter application, a front end search server, and a back end ranking server each operative on the processor circuit. The character set converter application may receive a search string comprised of one or more first character set characters, and convert the search string to one or more second character set characters that are different than the first character set. The front end search server may execute a search on the converted search string to obtain ranked individual search results. The back end ranking server may compare any first character set characters in the ranked individual search results to the first character set characters in the search string and sub-rank the ranked individual search results based on the strength of any matches.

In one embodiment, the first character set and the second character set may comprise character sets from any human language, including by way of example and without limitation any one of a Roman character set, a Chinese character set, a Japanese character set, a Russian character set, a Korean character set, a European character set, an Arabic character set, and so forth.

In one embodiment, the back end ranking server may be further operative to raise a sub-ranking of a ranked individual search result, lower the sub-ranking of a ranked individual search result, or leave unchanged the sub-ranking of a ranked individual search result. The sub-ranking may be raised when there is a match between a first character set character in the search string and a first character set character in the individual search result. The sub-ranking may be lowered when there is not a match between a first character set character in the search string and a first character set character in the individual search result. The sub-ranking may be left unchanged when there is no first character set character in the search string.

In one embodiment, the back end ranking server may be further operative to fine tune the sub-ranking process based on how many first character set characters in the search string and first character set characters in the ranked individual search result match. The back end ranking server may assign a highest sub-ranking to the ranked individual search result when all the first character set characters in the search string match with first character set characters in the individual search result. The back end ranking server may also assign a raised sub-ranking but not a highest sub-ranking to the ranked individual search result when some of the first character set characters in the search string match with first character set characters in the individual search result.

In one embodiment, the back end ranking server may be further operative to re-rank the ranked individual search results based on the sub-ranking results, and return the re-ranked individual search results to a requesting device over a network connection.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
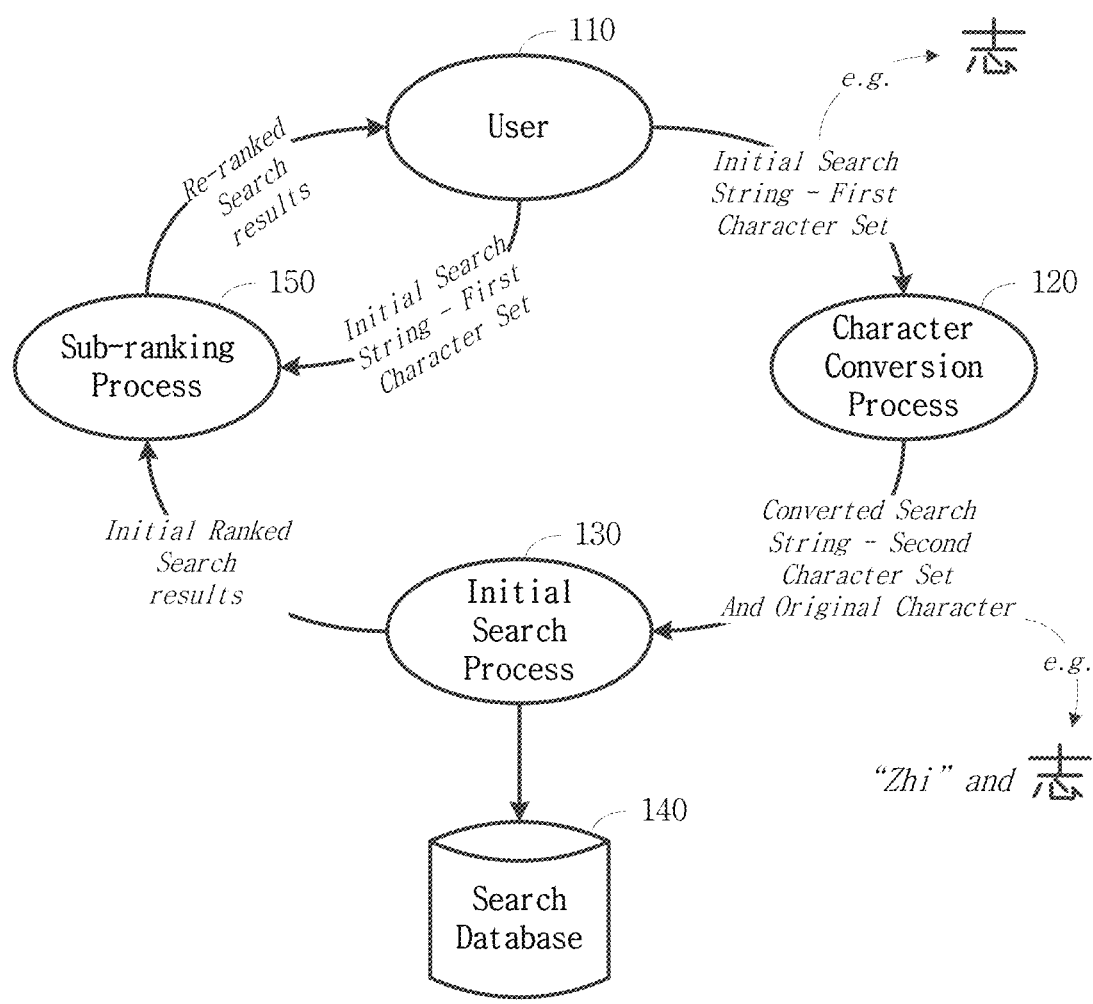
FIG. 1 illustrates a state diagram pertaining to a search query.

Various embodiments are generally directed to techniques for providing more relevant search results when searching using a character set different from a search database character set. In one embodiment, for example, an apparatus such as a client device and/or network server may comprise a character set converter application, a front end search server, and a back end ranking server each operative on the processor circuit. The character set converter application may receive a search term in the form of a search string comprised of one or more first character set characters, and convert the search string to one or more second character set characters that are different than the first character set. The front end search server may execute a search on the converted search string to obtain ranked individual search results. The back end ranking server may compare any first character set characters in the ranked individual search results to the first character set characters in the search string and sub-rank the ranked individual search results based on the strength of any matches. The back end ranking server may re-rank the ranked individual search results based on the sub-ranking results, thereby providing more relevant search results and/or rankings to a user.

Conventional search and ranking techniques involving language translation are unsatisfactory for a number of reasons. With respect to Chinese languages, for example, a search engine may utilize a name search index based on letters from a Roman character set. When a search is performed on a Chinese name using characters from the Chinese character set, the name is first converted to Roman form. The Roman form is then applied to the name search index and used to retrieve search results. For example, the character may be converted to the Roman form of "Zhi." A romanized search may then be conducted on the string "Zhi" and a character search on the character 志. The search results are then ranked according to a protocol and returned to the user that made the query. This technique, however, may return numerous results, many of which are unrelated to the original Chinese name. This is because many Chinese characters may have a same Roman translation. As a result, there may be ambiguities in the conversion, and some of the ranked results may not be relevant to the original Chinese name (e.g., having the character).

To provide better search result rankings, various embodiments herein may utilize one or more characters from an original search query, prior to conversion, and compare it with the search results of the Romanized search. With respect to the previous example involving Chinese characters, if there is a match for the same Chinese character in the search result, the ranking of that search result may increase. If there is a non-match on a Chinese character in the search result, the ranking of that search result may decrease. If there are no Chinese characters in the search result, the ranking may be unaffected, or ranked according to some secondary ranking parameters. In this manner, a user may receive search result rankings with more relevant information or less ambiguity, thereby improving user experience and productivity.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a state diagram 100 pertaining to a search query. A user 110 may be operating an electronic device capable of communicating with other electronic devices over a network connection as will be more fully described with reference to later figures. The user 110 may be formulating a query to be directed at an application that utilizes a translation engine. In one embodiment, for example, the user may formulate a search query for a search engine. The search query may be comprised of a series of characters from a first character set of a given language. In the example shown in FIG. 1, the first character set may be a Chinese character set. In the specific example given, the character may be input into a search query box of an application executing on a computer operated by the user 110.

This initial search string comprised of the Chinese character may be read as input to a character conversion process 120. The character conversion process 120 may determine an equivalent character string in a second character set in a same or different language (or dialect) as the first character set. The character conversion process 120 may then convert the initial search string in the first character set to a converted search string in the second character set. In this example, the second character set may be a Roman character set and the conversion of may result in the Roman characters "Zhi". The converted search string "Zhi" may now be received as input to an initial search process 130 along with the original character 志. The initial search process 130 may execute a search using a search database 140 with information comprised of characters from the first and second character sets. Thus, the initial search process 130 will search for the characters "Zhi" and provide initial ranked search results. The search results may be initially ranked based on a protocol of the search engine. These results, however, may contain many irrelevant yet highly ranked results. This may be due to ambiguities resulting from the character conversion process 110.

To further refine the search results, a sub-ranking process 150 may be performed on the initial ranked search results. The sub-ranking process 150 may receive as input the original search string in the first character set and the list of initial ranked search results. Even though the search results include the converted string "Zhi" in some capacity, many of the individual initial ranked search results may also include one or more characters from the first character set—in this case Chinese. Thus, the search results may include a blend of first and second character set characters. Each individual initial ranked search result may be compared to the original first character set search string to determine whether a given individual initial ranked search result includes a match to the original search string. Depending on the results of the comparison an individual initial ranked search result may be sub-ranked higher, lower or unchanged. The sub-ranking process 150 may then re-rank the initial ranked search results using the sub-ranking results to obtain re-ranked search results. The re-ranked search results may be more relevant to the user's initial search query since the highest ranked results may include a high sub-ranking based on matching first character set characters in addition to the standard protocol search ranking results obtained using the converted search string. The re-ranked search results may then be returned to the user 110 to complete the query process.

Figure 2:
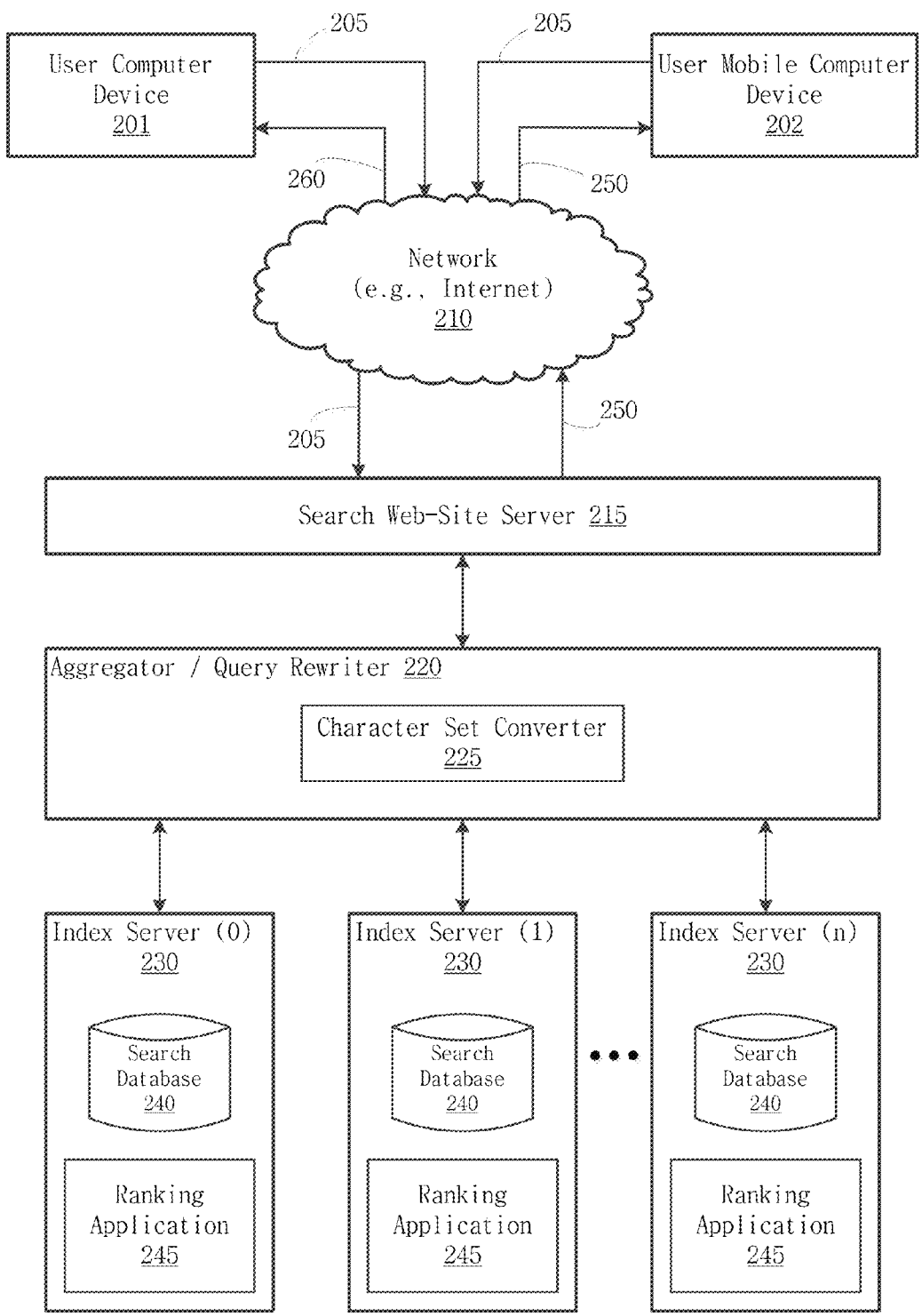
FIG. 2 illustrates an embodiment of an operating environment for a search system.

FIG. 2 illustrates an embodiment of an operating environment 200 for a search system. The operating environment 200 may be characterized as an information exchange between a user computer and a network computer with a communications network 210 disposed therebetween. In this embodiment, the user computer may be further characterized as a user computer device 201 or a user mobile computer 202. The network 210 may be, for example, the Internet. The network 210 may be another type of network that links multiple computers in a communicable fashion such as, for example, a personal area network (PAN), a local area network (LAN), a wide area network (WAN), a metropolitan area network (MAN), a cellular radiotelephone network, and so forth. The embodiments are not limited by these network examples.

Network 210 may provide access to a search web site server 215. The search web site server 215 may be part of a larger web site such as, for example, a social networking service (SNS) web site or social media web site, such as Facebook®, LinkedIn®, Google+®, MySpace®, Twitter®, Pinterest®, and so forth. In this scenario, the search portion of the web site may be characterized as a component or function of the larger social media web site. The search web site server 215 may also be associated with just a search web site on its own, such as Google®, Bing®, Yahoo®, and so forth. Moreover, many web sites are enabled with local searching capabilities that allow a user to search for information contained within just that web site and not necessarily anywhere else. The embodiments described herein may be applied to any of the above mentioned configurations. For purposes of clarity, the embodiments herein may refer simply to a search web site server 215.

The search web site server 215 may be executed by computer servers (e.g., a web server) under the control of one or more processor circuits. The search web site server 215 may be the portal or interface by which a user interacts with the applications (e.g., software) and servers (e.g., hardware) that comprise an overall search system. A network interface may serve as the gatekeeper of incoming and outgoing control and data traffic to and from the network 210. Network traffic, in turn, may come from or be intended for a user computer device 201 or mobile user device 202.

The search web site server 215 may receive an initial search query 205 from user computer device 201 or user mobile device 202 via network 210. The initial search query 205 may comprise characters from a first character set. The search web site server 215 may then forward the initial search query 205 to an aggregator/query rewriter module 220 that includes a character set converter application 225. The character set converter application 225 may be operative to convert a search query from a first character set to a second character set, wherein the second character set is different from the first character set. Such a conversion may be needed, for instance, when a search engine can perform searches based on more than one character set but receives a query using just one character set. To perform the search, the query is first converted to another character set used by the search engine.

Once the initial search query 205 has been converted, the converted search query may be input to a one of a plurality of index servers 230. The index server 230 performs a search against a search database 240 of knowledge to obtain one or more ranked search results. The search database 240 may comprise any suitable type of database, such as a relational database management system (RDBMS), for example. The index server 230 may comprise a search engine operative to parse a query and compare the parsed query against entries or information stored in the search database 240. Keyword searching may be one such technique used by the index server 230. The index server 230 may also rank the search results based on a given ranking algorithm or protocol that factors one or more variables. Variables may include the exactness of a keyword match, a location associated with the searcher and the search result (if available), user information, context information, device information and/or network information, among other variables.

If the search engine happens to be associated with a social media web site and the search query happens to be one seeking a person, the initial ranking variables for the search results may also include a number of mutual friends, the geographic proximity between the searcher and the person in the search result, a number of similar interests, etc. In any case, the index server 230 will return a ranked set of search results based, in part, on a search using the converted search string of the second character set.

It should be noted that the first character set and the second character set may comprise any character sets for any human languages. Examples of human languages may include without limitation a Roman character set, a Chinese character set, a Japanese character set, a Russian character set, a Korean character set, a European character set, and an Arabic character set. Moreover, according to the embodiments described herein it does not matter which character set is the first or second character set. Certain embodiments described herein use a Chinese character set as the first character set and a Roman character set as the second character set by way of example and not limitation. Other permutations may be used for given implementation.

The ranked search results may be further refined using a sub-ranking process performed by a ranking application 245 within index server 230. The ranking application 245 may be operative to re-evaluate the first character set search string against the ranked search results. Even though the ranked search results were obtained using the second character set, many of the individual results may nonetheless include characters from the first character set. While these first character set characters have not been considered by the index server 230 during the second character set search, they may be considered by the ranking application 245. Thus, as shown in the state diagram of FIG. 1, the ranking application 245 receives as input the original unconverted initial search query 205 expressed in the first character set and the ranked set of search results determined by the index server 230 for the second character set.

The ranking application 245 may analyze each of the individual ranked search results searching for first character set character matches with one or more of the non-converted first character set characters in the initial search query 205. Depending on the quality of matches (or non-matches) between first character set characters in the initial search query 205 and first character set characters in a given ranked search result, a given individual ranked search result may be sub-ranked higher, lower, or left unchanged. Once the ranking application 245 completes the sub-ranking process, it may re-rank the ranked search results to obtain re-ranked search results 250. The re-ranked search results 250 may be returned to the requesting user computer device 201 or requesting user mobile device 202 via network 210.

Figure 3:
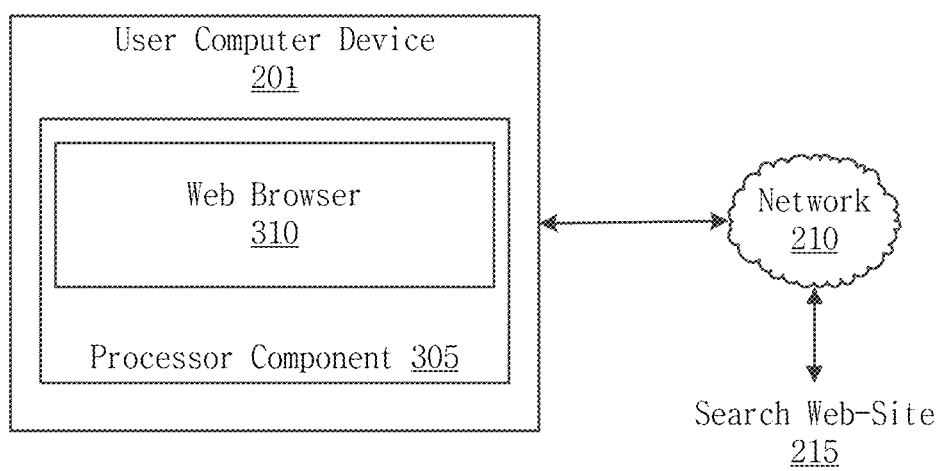
FIG. 3 illustrates an embodiment of a user computer device for use with the search system.

FIG. 3 illustrates an embodiment of a user computer device 201 for use with the search system. The user computer device 201 may be communicable with the search system over network 210. The user computer device 201 may take the form of a personal computer, desktop computer, and so forth. The embodiments are not limited to these examples, however. Specifically, the user computer device 201 may include a web browser application 310 operative on a processor component 305. The web browser application 310 may access the search web site server 215 over the network 210. The web browser application 310 may be embedded in a specific application such as, for instance, a social media application, executing on the user computer device 201. If a login procedure is needed to access the search or social media web site, the user may be asked to provide a username/password combination to gain access to the search web site server 215. Once connected, the user computer device 201 may interact with the search web site server 215 to browse the various web pages associated with the search web site server 215.

Figure 4:
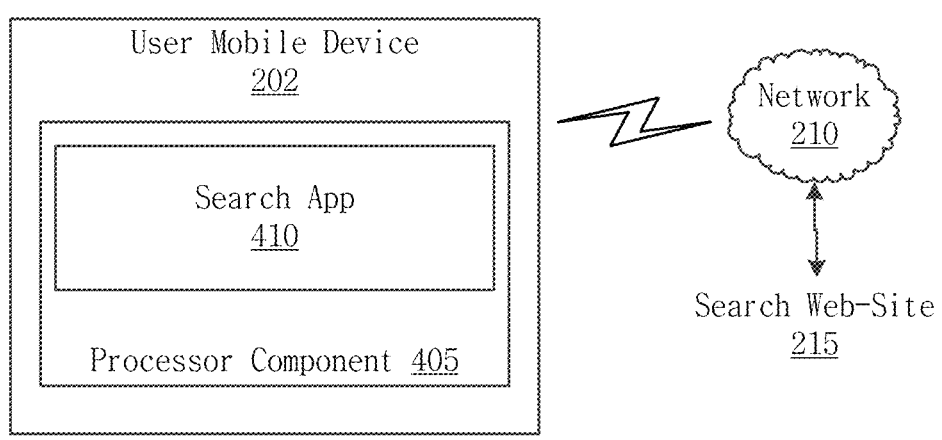
FIG. 4 illustrates an embodiment of a user mobile device for use with the search system.

FIG. 4 illustrates an embodiment of a user mobile device 202 for use with the search system. The user mobile device 202 may also be communicable with the search web site server 215. User mobile device 202 may comprise a user device such as a smartphone, cell phone, portable digital assistant (PDA), tablet computer, laptop computer, wearable computer, or any other form of electronic device. User mobile device 202 may be operative to execute one or more applications on behalf of a user, including first-party applications, third-party applications, applications provided with user mobile device 202, and applications installed by one or more users of user mobile device 202. The embodiments are not limited to these examples.

The user mobile device 202 may include a search application 410 operative on a processor component 405 that may access the search web site server 215 over the network 210 using a wireless connection. In some cases, the search application 410 may be embedded within a larger application executing on the user mobile device 202. If a login procedure is needed to access the search web site server 215, the user may be asked to provide a username/password combination to gain access to the search web site server 215. Once connected, the user mobile device 202 may interact with the search web site server 215 to browse the various web pages associated with the search web site server 215.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
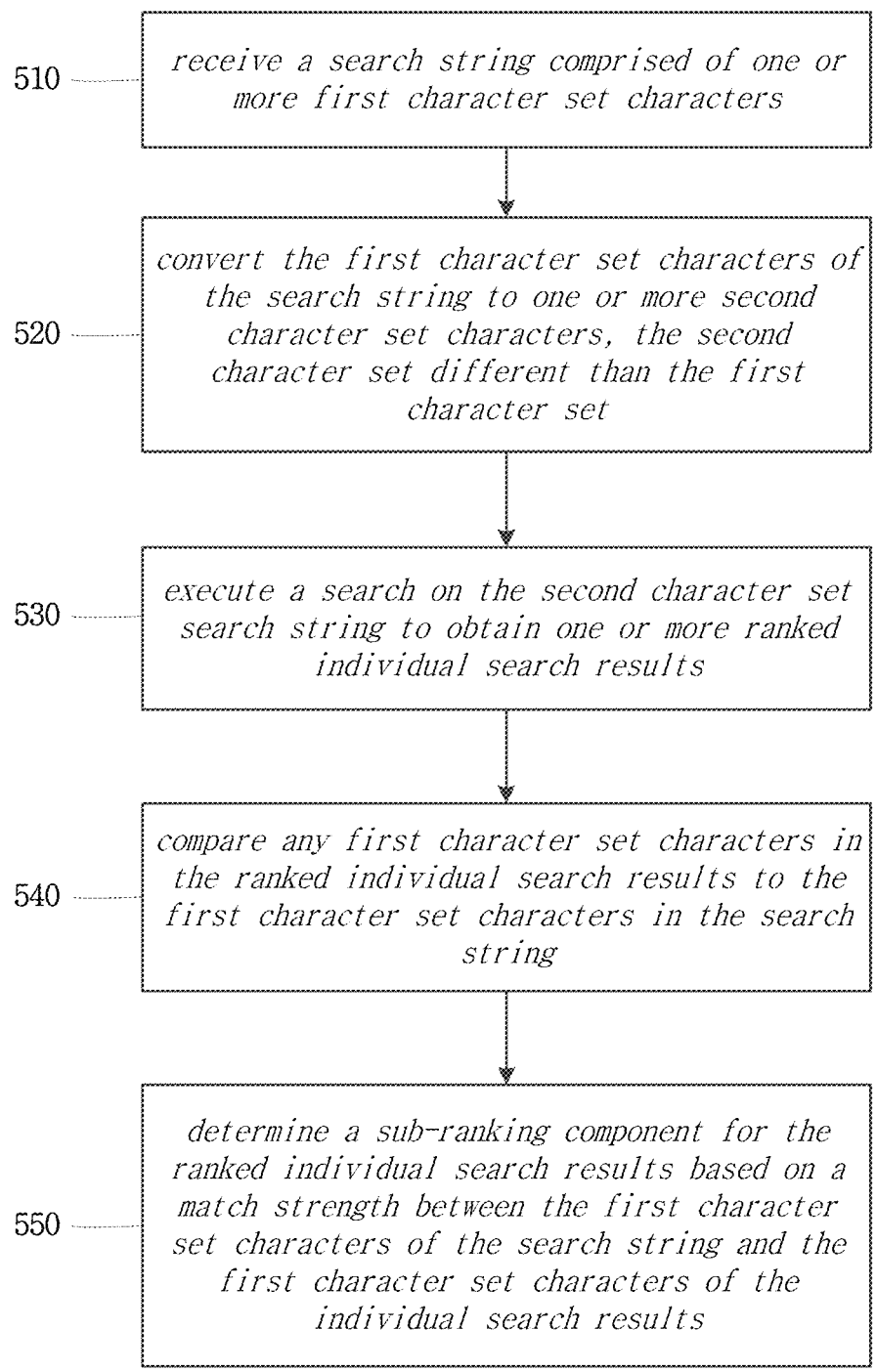
FIG. 5 illustrates an embodiment of a logic flow.

FIG. 5 illustrates an embodiment of a logic flow 500. The logic flow 500 may be representative of some or all of the operations executed by one or more embodiments described herein.

In the illustrated embodiment shown in FIG. 5, the logic flow 500 may be operative at block 510 to receive a search string comprised of one or more first character set characters. For example, a search web site server 215 may receive an initial search query 205 comprised of characters from a first character set such as Chinese characters. The initial search query 205 may be formulated by a user operating a user computer device 201 or a user mobile device 202. The user computer device 201 or user mobile device 202 may be coupled with the network 210 and in communication with the search web site server 215 using a web browser application 310 executing on the user computer device 201 or a specific application 410 executing on the user mobile device 202. The search web site server 215 may be part of a social media web site and the search function may be directed to finding people. The search query may comprise the name of a person expressed in Chinese characters.

In the illustrated embodiment shown in FIG. 5, the logic flow 500 may be operative at block 520 to convert the first character set characters of the search string to one or more second character set characters. The second character set may be different from the first character set. For example, the search engine associated with an index server 230 may be operative to perform searches based Roman characters and Chinese characters. To perform a search for the person identified in the search query, the search query may be converted to Roman characters (e.g., second character set). The conversion may be performed by a character set converter application 225 executing on the search web site server 215. The character set converter application 225 may replace the characters of the first character set with known equivalents in the second character set. For example, the name expressed in Chinese characters may be replaced by the Roman characters "Zhi".

In the illustrated embodiment shown in FIG. 5, the logic flow 500 may be operative at block 530 to execute a search on the second character set search string to obtain one or more ranked individual search results. For example, the index server 230 may receive the converted search string (e.g., "Zhi") generated by the character set converter application 225. The index server 230 may then utilize a search engine to access the search database 240 to perform keyword searching on the entries in the search database 240. The search database 240 entries contain at least some second character set characters. The search database 240 may also include entries that contain first character set characters in addition to the second character set characters. These first character set characters are not used by the index server 230 when the search engine is processing data from the second character set. The index server 230 may obtain a set of ranked search results based on the converted query.

In the illustrated embodiment shown in FIG. 5, the logic flow 500 may be operative at block 540 to compare any first character set characters in the ranked individual search results to the first character set characters in the search string. For example, the ranking application 245 may be operative to refine the ranked search results by re-evaluating the first character set characters that appear in the initial search query 205 and the individual ranked search results. The ranking application 245 may compare the first character set characters that appear in the initial search query 205 to each of the individual ranked search results to determine if any of the individual ranked search results contain first character set characters that match to the first character set characters contained in the initial search query 205.

In the illustrated embodiment shown in FIG. 5, the logic flow 500 may be operative at block 550 to determine a sub-ranking component for the ranked individual search results based on a match strength between the first character set characters of the search string and the first character set characters of the individual search results. For example, the ranking application 245 may be operative to determine the number and quality of matches of first character set characters that appear in both the initial search query 205 and the ranked search results.

The embodiments are not limited to the examples described with reference to FIG. 5. For example, the first character set may be comprised of Roman characters, Chinese characters, Japanese characters, Russian characters, Korean characters, European characters, and Arabic characters. Similarly, the second character set may be comprised of Roman characters, Chinese characters, Japanese characters, Russian characters, Korean characters, European characters, and Arabic characters. The character sets listed above are further examples of character sets but are not limiting to the embodiments herein. Other character sets not specifically enumerated here may also benefit from the embodiments described herein. So long as the first and second character sets are different in a given search implementation, the embodiments described herein apply.

Figure 6:
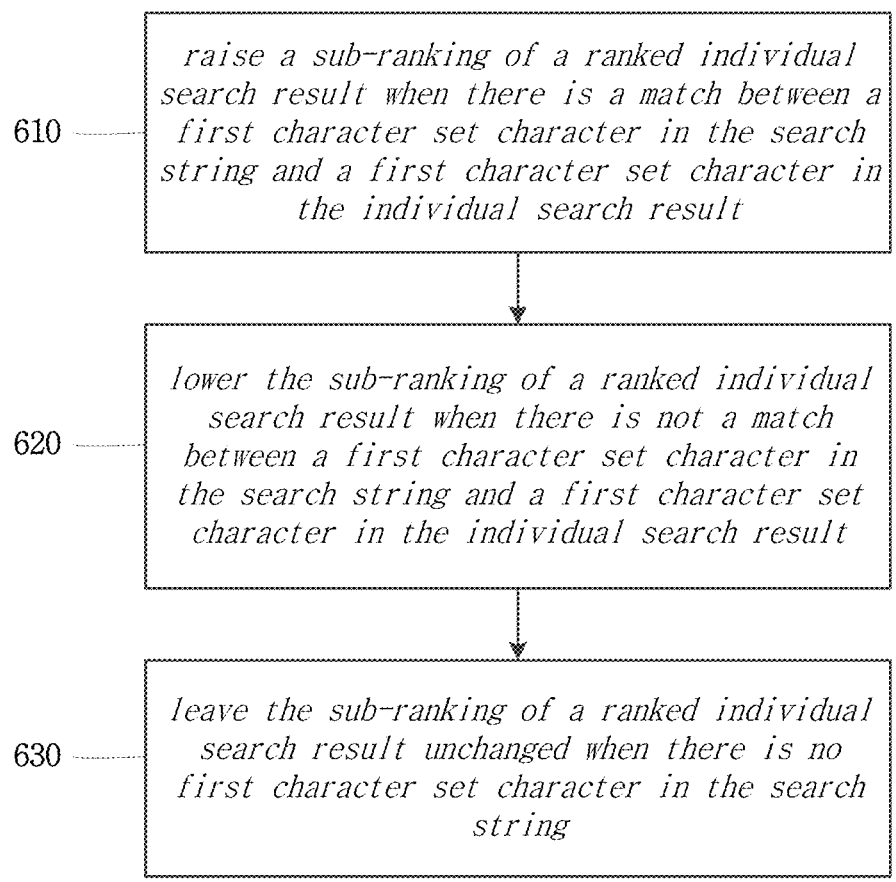
FIG. 6 illustrates an embodiment of a logic flow.

FIG. 6 illustrates an embodiment of a logic flow 600. The logic flow 600 may be representative of some or all of the operations executed by one or more embodiments described herein.

In the illustrated embodiment shown in FIG. 6, the logic flow 600 may be operative at block 610 to raise a sub-ranking of a ranked individual search result when there is a match between a first character set character in the search string and a first character set character in the individual search result. For example, the ranking application 245 may determine that a given individual search result from the set of ranked search results contains a first character set character match to a character in the initial search query 205. In such a case, the ranking application 245 may raise the sub-ranked value of the individual search result as a result of the positive match.

In the illustrated embodiment shown in FIG. 6, the logic flow 600 may be operative at block 620 to lower the sub-ranking of a ranked individual search result when there is not a match between a first character set character in the search string and a first character set character in the individual search result. For example, the ranking application 245 may determine that a given individual search result from the set of ranked search results does not contain a first character set character match to a character in the initial search query 205 even though the given individual search result may contain one or more first character set characters. In such a case, the ranking application 245 may lower the sub-ranked value of the individual search result as a result of a negative match to first character set characters that may be contained in the given individual search result.

In the illustrated embodiment shown in FIG. 6, the logic flow 600 may be operative at block 630 to leave the sub-ranking of a ranked individual search result unchanged when there are no first character set characters in the individual search result. For example, the ranking application 245 may determine that a given individual search result from the set of ranked search results does not contain any first character set characters. In such a case, the ranking application 245 may leave the sub-ranked value of the individual search result unchanged. That is, the lack of first character set characters in the given individual search result does not bias or affect a re-ranking of that individual search result.

The embodiments are not limited to the examples described with reference to FIG. 6.

Figure 7:
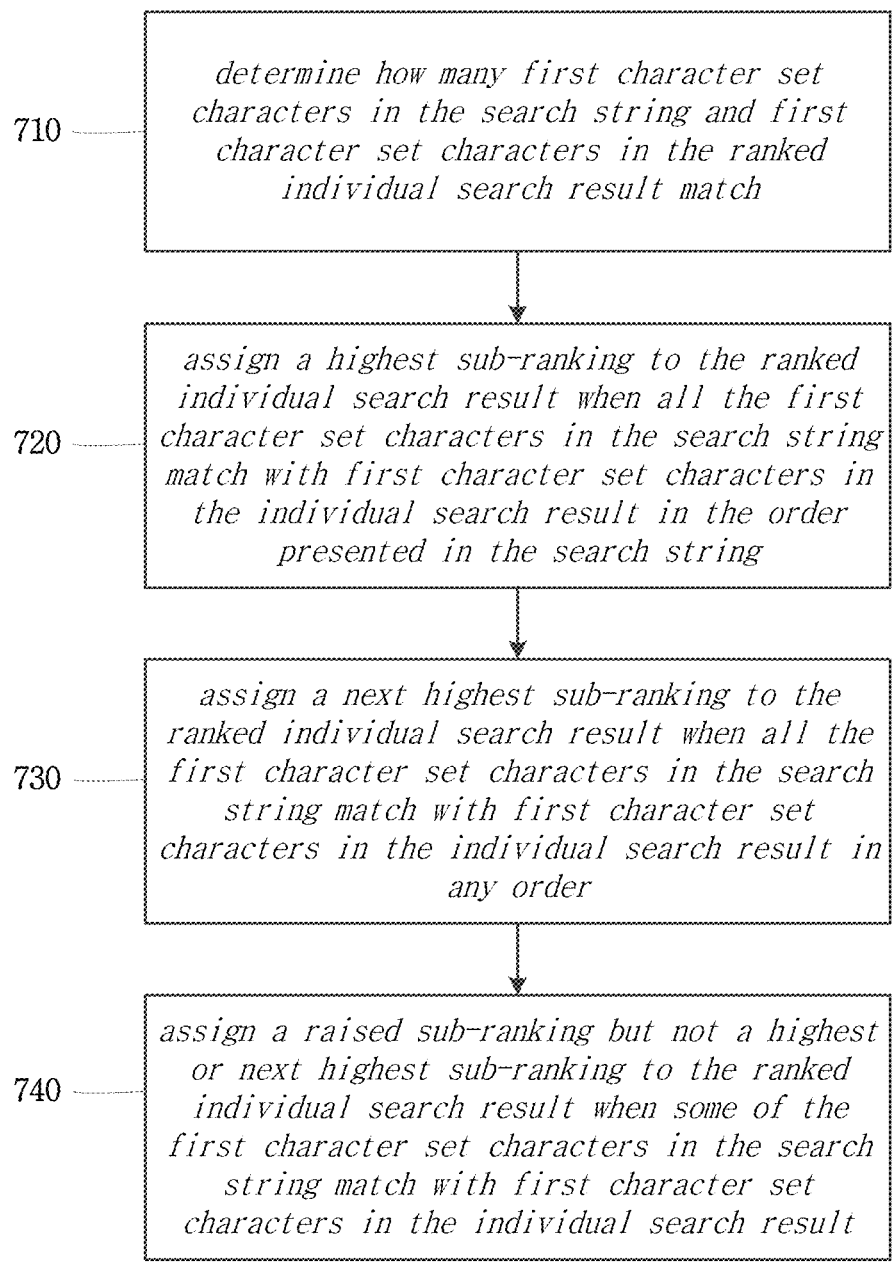
FIG. 7 illustrates an embodiment of a logic flow.

FIG. 7 illustrates an embodiment of a logic flow 700. The logic flow 700 may be representative of some or all of the operations executed by one or more embodiments described herein.

In the illustrated embodiment shown in FIG. 7, the logic flow 700 may be operative at block 710 to determine how many first character set characters in the search string and first character set characters in the ranked individual search results match. For example, the ranking application 245 may analyze how many of the first character set characters in the initial search query 205 appear in the each of the ranked search results. The number of matches may affect the sub-ranking of that particular ranked search result.

In the illustrated embodiment shown in FIG. 7, the logic flow 700 may be operative at block 720 to assign a highest sub-ranking to the ranked individual search result when all the first character set characters in the search string match with first character set characters in the individual search result in the order presented in the search string. For example, the ranking application 245 may determine that all of the first character set characters in the initial search query 205 appear in a given ranked search result and that they appear in the order presented in the initial search string 205. In this case, the ranked search result may be accorded the highest sub-ranking since it contains a perfect match with initial search query 205.

In the illustrated embodiment shown in FIG. 7, the logic flow 700 may be operative at block 730 to assign a next highest sub-ranking to the ranked individual search result when all the first character set characters in the search string match with first character set characters in the individual search result in the order presented in the initial search query 205. For example, the ranking application 245 may determine that all of the first character set characters in the initial search query 205 appear in a given ranked search result but that they appear in a different order than presented in the initial search string 205. In this case, the ranked search result may be accorded the next highest sub-ranking since it contains all the first character set characters in the initial search query 205. This may occur, for instance, when a first name and a last name are transposed. Or, for a non-name search query, this may occur when the semantics of the initial search query 205 and the semantics of the ranked search result are slightly different but use the same characters.

In the illustrated embodiment shown in FIG. 7, the logic flow 700 may be operative at block 740 to assign a raised sub-ranking but not a highest or next highest sub-ranking to the ranked individual search result when some of the first character set characters in the search string match with first character set characters in the individual search result. For example, the ranking application 245 may determine that only some of the first character set characters in the initial search query 205 appear in a given ranked search result. In this case, the ranked search result may be accorded a raised sub-ranking since it contains some matches with initial search query 205.

The embodiments are not limited to the examples described with reference to FIG. 7.

Figure 8:
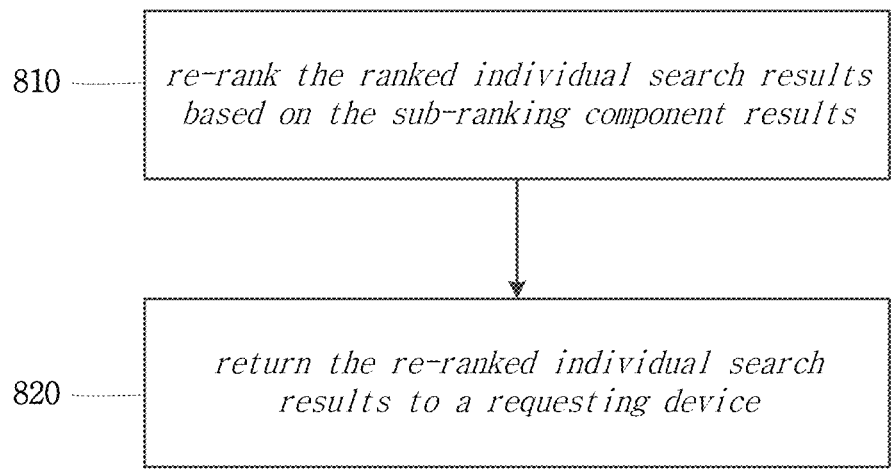
FIG. 8 illustrates an embodiment of a logic flow.

FIG. 8 illustrates an embodiment of a logic flow 800. The logic flow 800 may be representative of some or all of the operations executed by one or more embodiments described herein.

In the illustrated embodiment shown in FIG. 8, the logic flow 800 may be operative at block 810 to re-rank the ranked individual search results based on the sub-ranking component results. For example, the ranking application 245 may adjust the ranked search results to incorporate the sub-ranking process just completed. Any individual ranked search results that received the highest, next highest, or a raised sub-ranking may be shifted upward in the rankings. Similarly, any individual ranked search results that received a lower sub-ranking may be shifted downward in the rankings. Any individual ranked search results that were left unchanged by the sub-ranking process may maintain their original ranked status. The original ranked status, however, may be altered by the fact that other individual ranked search results have been altered (e.g., raised or lowered). The degree to which to raise or lower a ranking based on a sub-ranking may be determined by the ranking application 245 using one or more criteria. That is, the importance given to the sub-ranking process may be factored into the re-ranking process.

In the illustrated embodiment shown in FIG. 8, the logic flow 800 may be operative at block 820 to return the re-ranked individual search results to a requesting device. For example, the ranking application 245 may, in response to the initial search query 205, return the re-ranked search results 250 to a user computer device 201 or a user mobile device 202 depending on which device was used to send the initial search query 205. The re-ranked search results 250 may then be displayed to the user on the associated device.

The embodiments are not limited to the examples described with reference to FIG. 8.

Figure 9A:
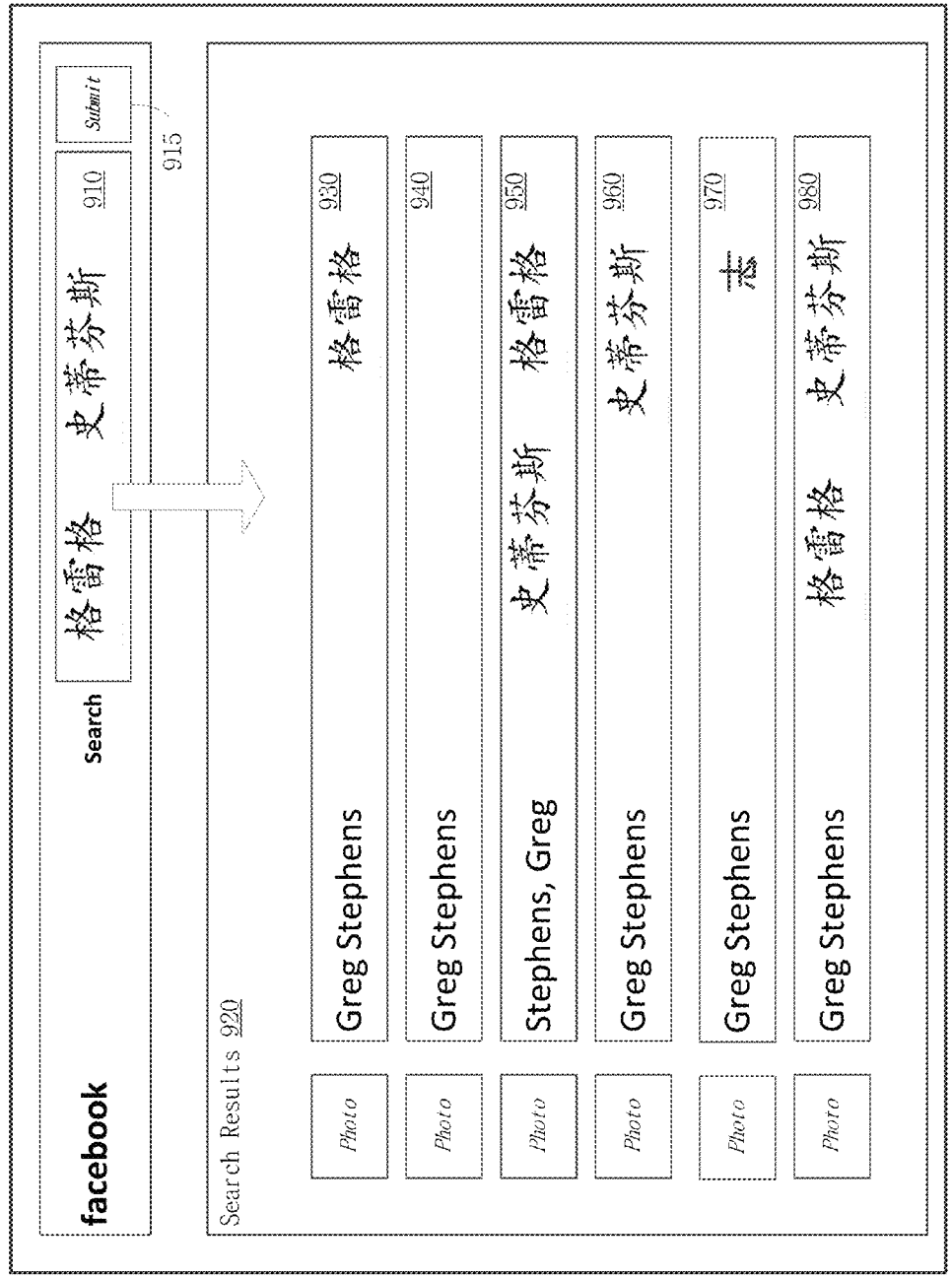
FIG. 9A illustrates an embodiment of a web-based user interface for displaying the results of using the search system prior to re-ranking.

FIG. 9A illustrates an embodiment of a web-based user interface 900 for displaying the results of using the search system prior to re-ranking. The web-based user interface 900 may be displayable on a user computer device 201 or a user mobile device 202 using a web browser or application with embedded browser display capabilities. The actual configuration of the screen components shown in FIG. 9A is illustrative and is not to be considered limiting. The look and feel of a user interface may vary from device to device and from application to application.

In this example, a web browser is showing a search banner 910 and a corresponding submit button 915. Inside the search banner 910, the user has entered characters in a first character set (e.g., Chinese) for the name of a person for whom a search is to be conducted. In this case the Chinese characters 格雷格 and 斯蒂芬斯 have been entered. These characters may be roughly translated and converted to the Roman characters "Greg" and "Stephens." Thus, the user may be attempting to search for a person named Greg Stephens using the Chinese character representation of the name. The web browser is also showing the results of the search. Specifically, the initially ranked search results 920 prior to any re-ranking process. In this example, we will assume that the six results shown 930-980 all relate to someone named Greg Stephens.

In this case, the search results have been ranked based solely on a ranking algorithm or protocol relating to the Roman characters in the search engine. Thus, the existence of the Chinese characters in the individual search results is of no relevance to the search engine ranking process.

Figure 9B:
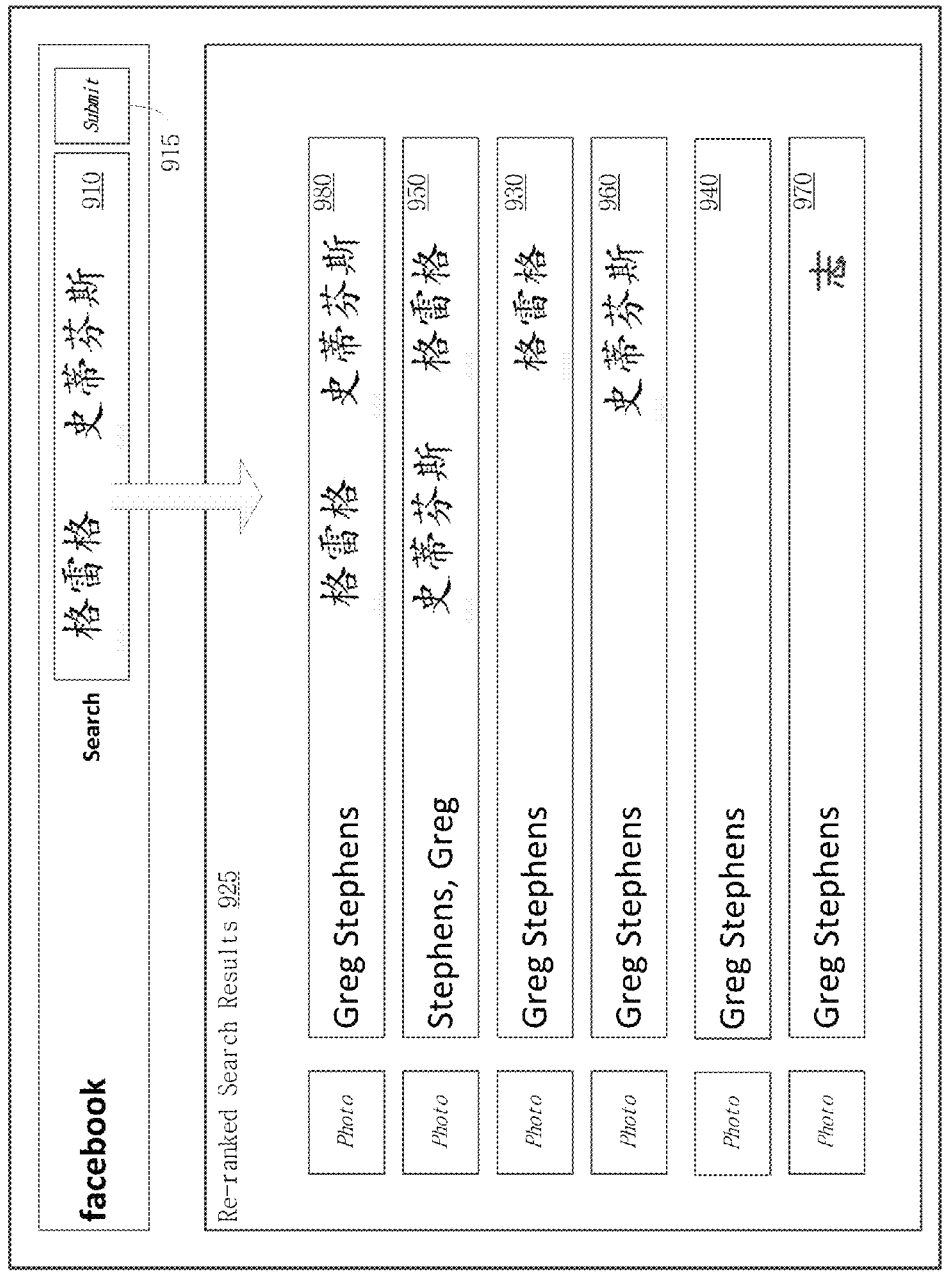
FIG. 9B illustrates an embodiment of a web-based user interface for displaying the results of using the search system after re-ranking.

FIG. 9B illustrates an embodiment of a web-based user interface 900 for displaying the results of using the search system after re-ranking. The web-based user interface 900 may be displayable on a user computer device 201 or a user mobile device 202 using a web browser or application with embedded browser display capabilities. The actual configuration of the screen components shown in FIG. 9B is illustrative and is not to be considered limiting. The look and feel of a user interface may vary from device to device and from application to application.

In this example, a web browser is showing the same search banner 910 and a corresponding submit button 915. Inside the search banner 910, the user has entered the same characters in a first character set (e.g., Chinese) for the name of a person for whom a search is to be conducted. In this case the Chinese characters 格雷格 and 斯蒂芬斯 have been entered. These characters may be roughly translated and converted to the Roman characters "Greg" and "Stephens." Thus, the user may be attempting to search for a person named Greg Stephens using the Chinese character representation of the name. The web browser is also showing the results of the search. Specifically, the re-ranked search results 925 after the embodiments described above have been applied to the initial search string 格雷格 斯蒂芬斯 are illustrated. The ranked search results that may have been initially returned from the index server 230 using a Roman character based search engine may have initially returned the results shown in the order illustrated in FIG. 9A. The re-ranked search results, however, have ordered the results to reflect an analysis of the Chinese characters as well as the ranking protocol of the Roman character search engine.

If one were to assume that the five search results were otherwise ranked together based on the initial ranking protocol, the re-ranked search results 925 may reflect any changes determined in the sub-ranking process. In this case, the highest rated result 930 includes all of the Chinese characters that appear in the initial search string and in the same order as they were presented in the initial search string. Thus, result 980 has been accorded the highest sub-ranking. The next highest rated result 950 also includes all of the Chinese characters that appear in the initial search string. This time, however, the characters for the first and last name have been transposed leading to a lower sub-ranking since it is not an exact match to the initial search string. The next result 930 only includes some of the Chinese characters but not all the Chinese characters in the initial search string. Specifically, result 930 includes the Chinese characters corresponding to the Roman characters "Greg." The overall ranking for result 930 may be raised since it does contain some of the Chinese characters in the original search string. Result 960 also includes only some of the Chinese characters but not all the Chinese characters in the initial search string. Specifically, result 960 includes the Chinese characters corresponding to the Roman characters "Stephens." The overall ranking for result 960 may be raised as well since it does contain some of the Chinese characters in the original search string. Perhaps it falls just below result 930 since its Chinese characters appear later in the original search string than the Chinese characters in result 930. Result 940 does not include any Chinese characters and may therefore be left unchanged by the sub-ranking process. It may still move in the rankings based on other results moving up or down however. Lastly, result 970 may have been lowered since it does contain Chinese characters but none that match any in the original search string.

Figure 10A:
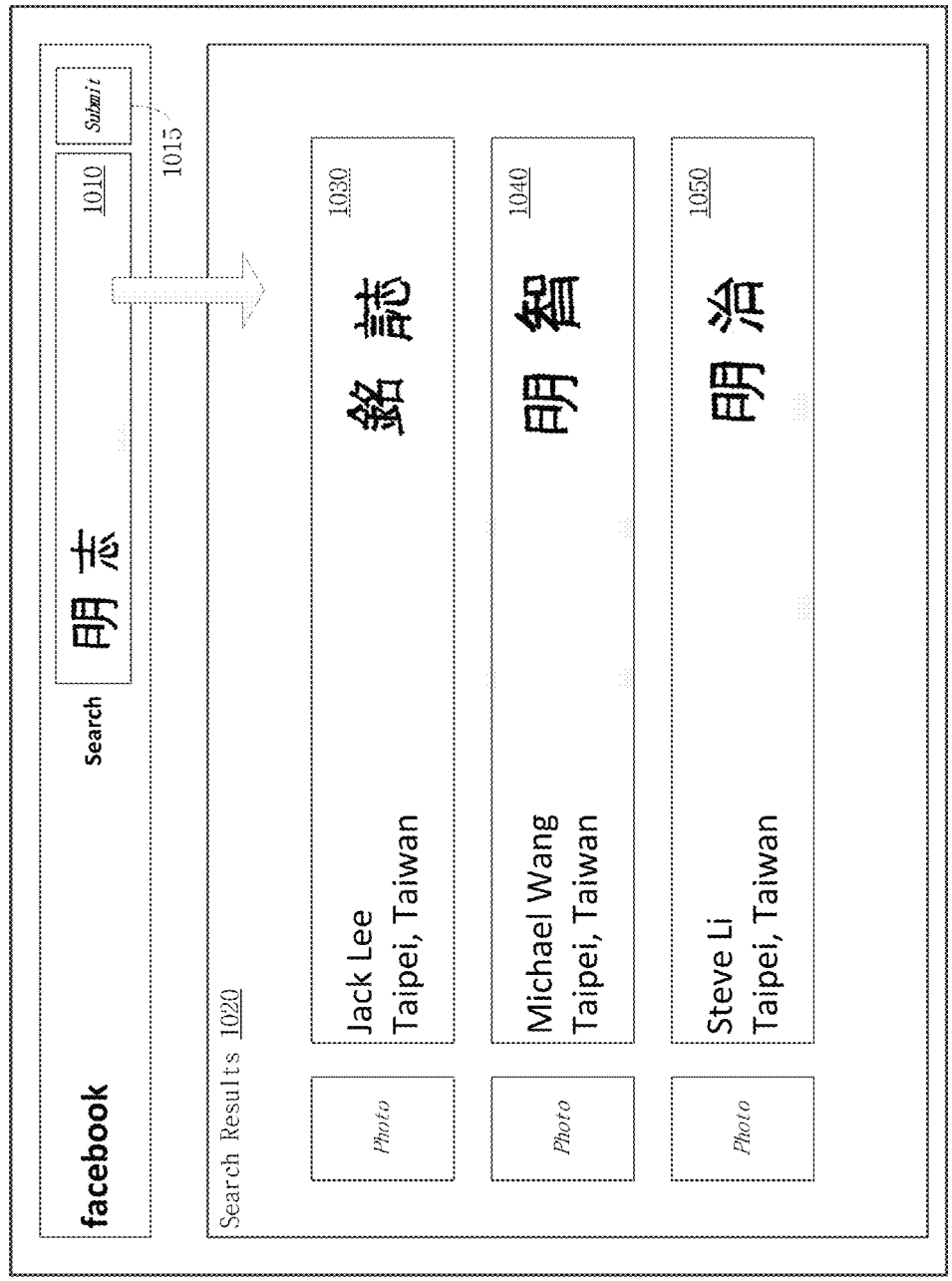
FIG. 10A illustrates another embodiment of a web-based user interface for displaying the results of using the search system prior to re-ranking.

FIG. 10A illustrates another embodiment of a web-based user interface 1000 for displaying the results of using the search system prior to re-ranking. This example illustrates what can happen to search results when a Chinese character may have more than one Roman character translation. Just as in FIGS. 9A-B, the web-based user interface 1000 may be displayable on a user computer device 201 or a user mobile device 202 using a web browser or application with embedded browser display capabilities. The actual configuration of the screen components shown in FIG. 10A is illustrative and is not to be considered limiting. The look and feel of a user interface may vary from device to device and from application to application.

In this example, a web browser is showing a search banner 1010 and a corresponding submit button 1015. Inside the search banner 1010, the user has entered characters in a first character set (e.g., Chinese) for the name of a person for whom a search is to be conducted. In this case the Chinese characters have been entered. These characters may be converted to Roman characters. Thus, the user may be attempting to search for a person using a Chinese character representation of the name. Unlike the example described with reference to FIGS. 9A, 9B, however, the Chinese characters may be translated into different Roman characters. This is because a single Chinese character may have multiple different translations, some of which may be of no interest to the user 110 when initially formulating the original search query.

The web browser is showing the results of the search. Specifically, the initially ranked search results 1020 prior to any re-ranking process. In this example, the search results 1020 indicate the first three individual results 1030-1050. These results may have been initially ranked based on the Roman character translation of the initial input Chinese characters ( ) as indexed against only the Roman characters available to the search engine. Thus, the search results may be dependent solely on the Roman character translation of the Chinese character input. In this case, the search results 1020 have been ranked based solely on a ranking algorithm or protocol relating to the Roman characters in the search engine. Thus, the existence of the Chinese characters in the individual search results 1020 is of no relevance to the search engine ranking process.

Figure 10B:
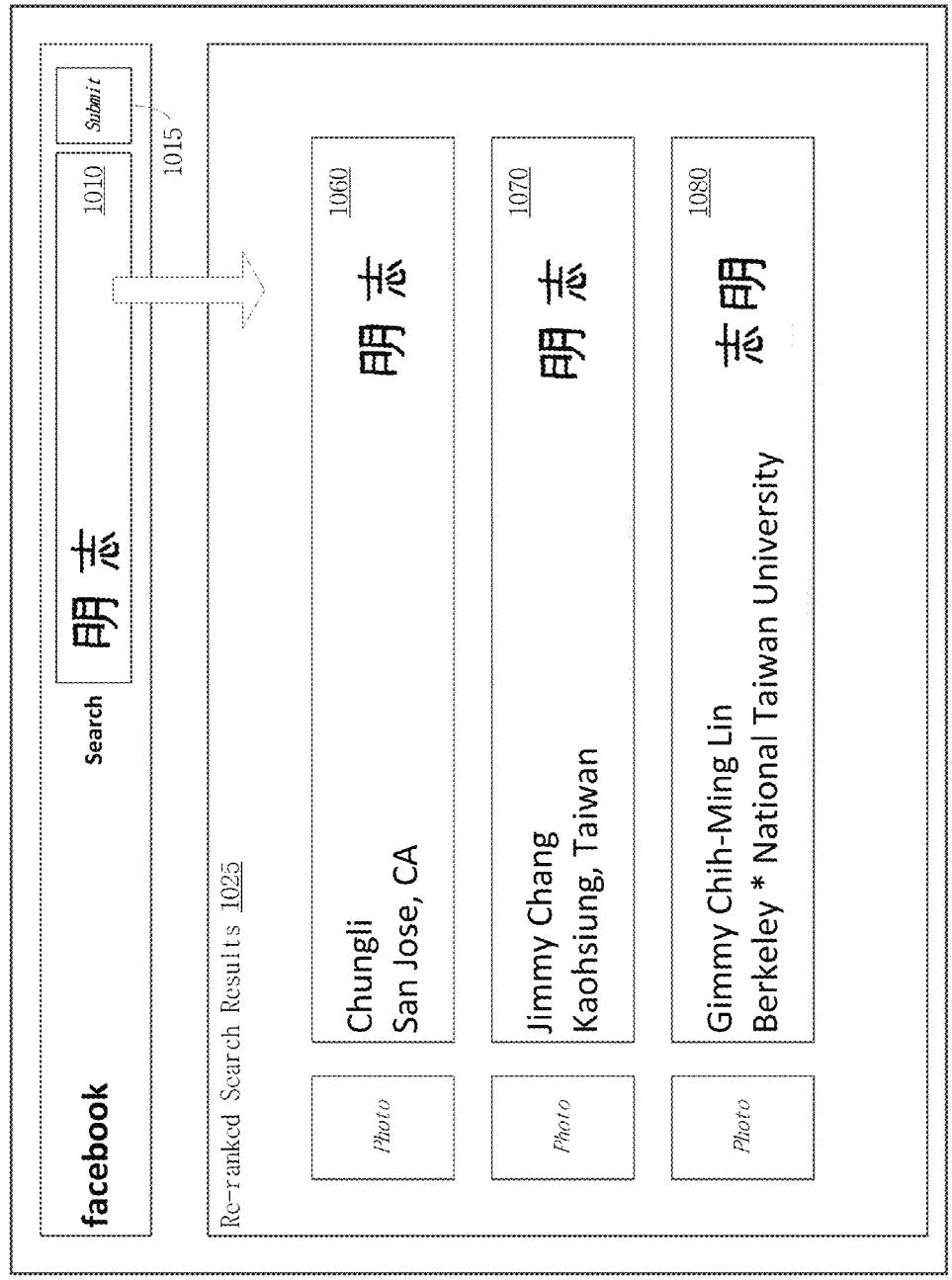
FIG. 10B illustrates another embodiment of a web-based user interface for displaying the results of using the search system after re-ranking.

FIG. 10B illustrates another embodiment of a web-based user interface 1000 for displaying the results of using the search system after re-ranking. The web-based user interface 1000 may be displayable on a user computer device 201 or a user mobile device 202 using a web browser or application with embedded browser display capabilities. The actual configuration of the screen components shown in FIG. 10B is illustrative and is not to be considered limiting. The look and feel of a user interface may vary from device to device and from application to application.

In this example, the web browser is showing the same search banner 1010 and a corresponding submit button 1015. Inside the search banner 1010, the user has entered the same characters in a first character set (e.g., Chinese) for the name of a person for whom a search is to be conducted. In this case the Chinese characters have been entered. These Chinese characters may be roughly translated and converted to Roman characters for a name to be searched. The web browser is also showing the results of the search. Specifically, the re-ranked search results 1025 after the embodiments described above have been applied to the initial search string are illustrated. The ranked search results that may have been initially returned from the index server 230 using a Roman character based search engine may have initially returned the results shown in the order illustrated in FIG. 10A. The re-ranked search results 1025, however, have ordered the results to reflect an analysis of the Chinese characters as well as the ranking protocol of the Roman character search engine. The re-ranked search results 1025 may be re-ranked based on any number of factors, including a match of one or more particular Chinese characters in the original query to the Chinese characters in the search results, a total number of matches in a set of the Chinese characters in the original query to the set of Chinese characters in the search results, a sequence or order in the matched characters, and so forth. The embodiments are not limited in this context.

The re-ranked search results 1025 may reflect any changes determined in the sub-ranking process. In this case, the top three results are completely different than those shown in FIG. 10A. The two highest rated results 1060, 1070 include all of the Chinese characters that appear in the initial search string and in the same order as they were presented in the initial search string. The result 1060 may have been accorded the highest sub-ranking over that of result 1070. This may be based on the original ranking of the search result prior to re-ranking. For instance result 1060 may have been ranked higher than result 1070 prior to the sub-ranking and re-ranking process perhaps based on a location parameter or a common likes/dislikes parameter. The next highest rated result 1080 also includes all of the Chinese characters that appear in the initial search string. This time, however, the characters for the first and last name have been transposed leading to a lower sub-ranking since it is not an exact match to the initial search string.

The re-ranking process illustrates how the search process can incorporate the first character set characters (e.g., Chinese characters) into a search that is indexed only against a second character set (e.g., Roman characters) to improve the quality of the search results for users. The re-ranked search results 1025 illustrated in FIG. 10B may have initially been ranked lower than the search results 1020 illustrated in FIG. 10A despite the fact that the same input characters were used. The difference is that the re-ranked search results 1025 (FIG. 10B) also include a first character set analysis of the search results not performed during the initial ranking illustrated by search results 1020 (FIG. 10A).

Figure 11:
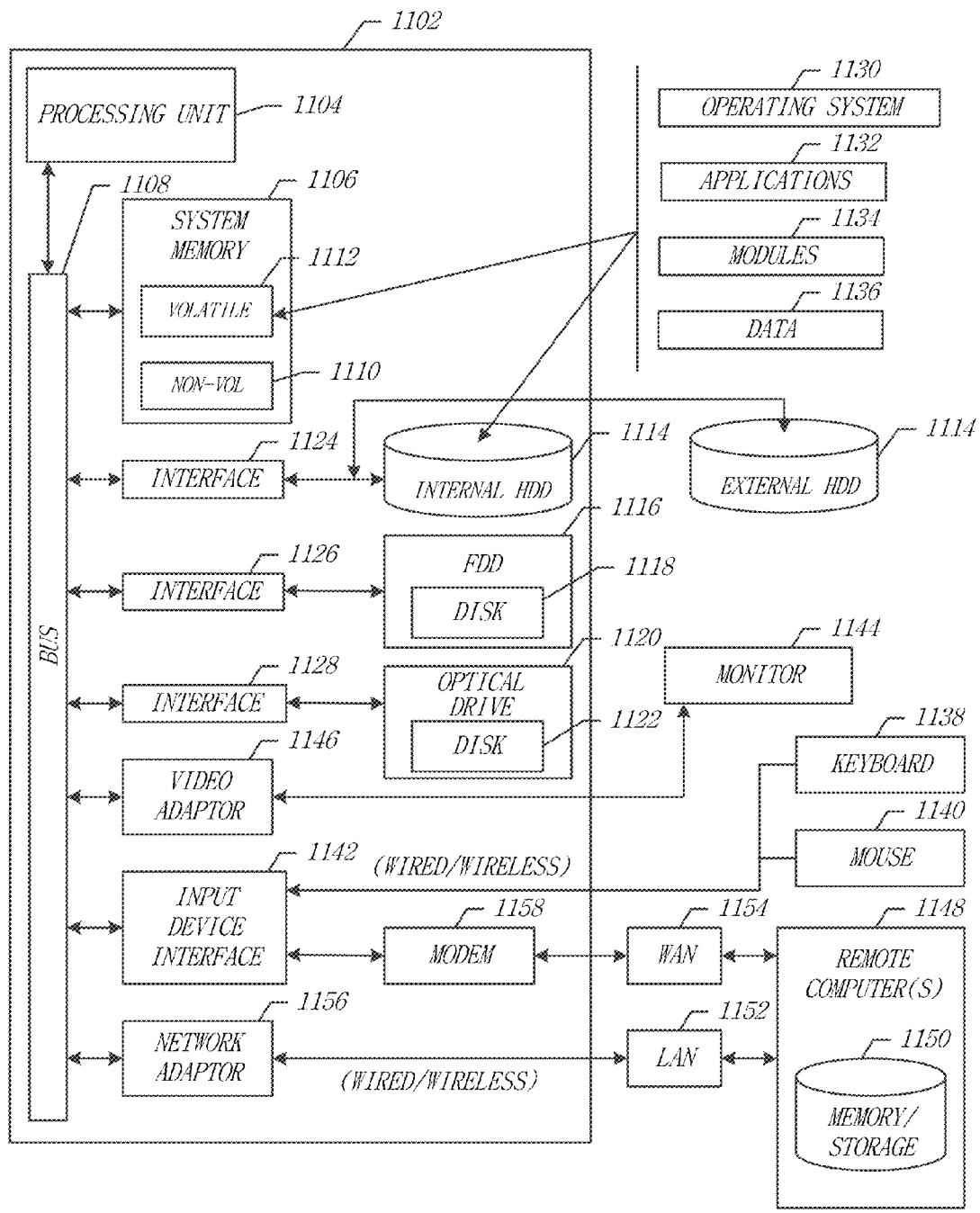
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the display system 110.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
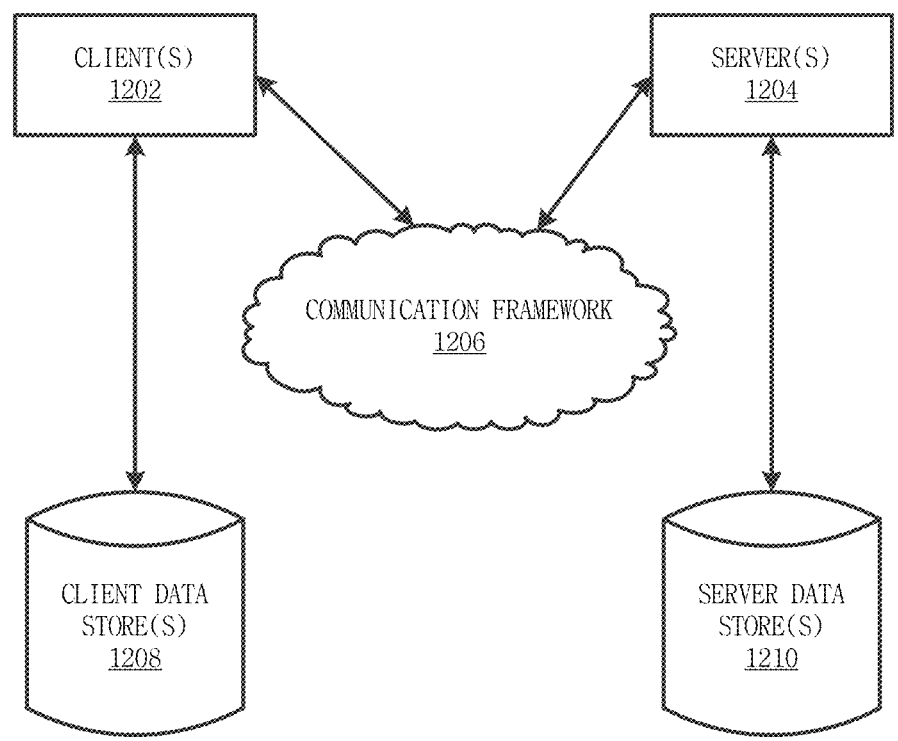
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client devices 201 and 202. The servers 1204 may implement the server devices 240 and 255. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 12/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a processor circuit;
   a character set converter application operative on the processor circuit to receive a first character set search string comprising one or more characters in a first character set, and convert the one or more characters in the first character set to one or more characters in a second character set;
   an index server operative to execute a search using the one or more characters in the second character set to obtain one or more second character set ranked search results; and
   a ranking application operative on the index server to re-rank the results of the search in the second character set based on the number of appearances of characters from the first character set in each result in the search results in the second character set.

2. The apparatus of claim 1, the first character set and the second character set comprising any one of a Roman character set, a Chinese character set, a Japanese character set, a Russian character set, a Korean character set, a European character set, and an Arabic character set.

3. The apparatus of claim 1, the search string comprising one or more characters of the first character set and one or more characters of the second character set.

4. The apparatus of claim 1, the ranking application further operative to:
   raise a ranking of an individual ranked search result when there is a match between a first character set character in the search string and a first character set character in the individual ranked search result;
   lower the ranking of an individual ranked search result when there is not a match between a first character set character in the search string and a first character set character in the individual ranked search result; and
   leave the ranking of an individual ranked search result unchanged when there is no first character set character in the search string.

5. The apparatus of claim 4, the ranking application further operative to:
   determine how many first character set characters in the search string and first character set characters in the individual ranked search result match;
   assign a highest ranking to the individual ranked search result when all the first character set characters in the search string match with first character set characters in the individual ranked search result; and
   assign a raised ranking, but not a highest ranking, to the individual ranked search result when some of the first character set characters in the search string match with first character set characters in the individual ranked search result.

6. The apparatus of claim 5, the ranking application further operative to re-rank the ranked search results based on the ranking obtained by the ranking application.

7. The apparatus of claim 6, the ranking application further operative to return the re-ranked individual ranked search results to a requesting device.

8. A computer-implemented method, comprising:
   receiving a first character set search string comprising one or more characters in a first character set;
   converting the one or more characters in the first character set to one or more characters in a second character set;
   executing a search using the one or more characters in the second character set to obtain one or more second character set ranked search results;
   determining that the one or more ranked search results includes a character in the first character set; and
   re-ranking the one or more second character set ranked search results based on a match strength, the match strength being determined based on the number of appearances of characters from the first character set in each result in the search results in the second character set.

9. The computer-implemented method of claim 8, the first character set and the second character set comprising any one of a Roman character set, a Chinese character set, a Japanese character set, a Russian character set, a Korean character set, a European character set, and an Arabic character set.

10. The computer-implemented method of claim 8, the search string comprising one or more characters of the first character set and one or more characters of the second character set.

11. The computer-implemented method of claim 8, ranking the one or more ranked search results comprising:
   raising a ranking of an individual ranked search result when there is a match between a first character set character in the search string and a first character set character in the individual ranked search result;
   lowering the ranking of an individual ranked search result when there is not a match between a first character set character in the search string and a first character set character in the individual ranked search result; and
   leaving the ranking of an individual ranked search result unchanged when there is no first character set character in the search string.

12. The computer-implemented method of claim 11, ranking the one or more ranked search results further comprising:

determining how many first character set characters in the search string and first character set characters in the individual ranked search result match;

assigning a highest ranking to the individual ranked search result when all the first character set characters in the search string match with first character set characters in the individual ranked search result; and assigning a raised ranking, but not a highest ranking, to the individual ranked search result when some of the first character set characters in the search string match with first character set characters in the individual ranked search result.

13. The computer-implemented method of claim 12, comprising re-ranking the ranked search results based on the ranking of the one or more ranked search results.

14. The computer-implemented method of claim 13, comprising returning the re-ranked individual ranked search results to a requesting device.

15. A system comprising a non-transitory computer-readable storage medium including instructions that, when executed by processor circuitry, cause a system to:

receive a first character set search string comprising one or more characters in a first character set;

convert the one or more characters in the first character set to one or more characters in a second character set;

execute a search using the one or more characters in the second character set to obtain one or more second character set ranked search results;

determine that the one or more ranked search results includes a character in the first character set; and re-rank the one or more second character set ranked search results based on a match strength, the match strength being determined based on the number of appearances of characters from the first character set in each result in the search results in the second character set.

16. The system of claim 15, the first character set and the second character set comprising any one of a Roman character set, a Chinese character set, a Japanese character set, a Russian character set, a Korean character set, a European character set, and an Arabic character set.

17. The system of claim 15, the search string comprising one or more characters of the first character set and one or more characters of the second character set.

18. The system of claim 15, comprising further instructions that, when executed by the processor circuitry, cause the system to:

raise a ranking of an individual ranked search result when there is a match between a first character set character in the search string and a first character set character in the individual ranked search result;

lower the ranking of an individual ranked search result when there is not a match between a first character set character in the search string and a first character set character in the individual ranked search result; and leave the ranking of an individual ranked search result unchanged when there is no first character set character in the search string.

19. The system of claim 18, comprising further instructions that, when executed by the processor circuitry, cause the system to:

determine how many first character set characters in the search string and first character set characters in the individual ranked search result match;

assign a highest ranking to the individual ranked search result when all the first character set characters in the search string match with first character set characters in the individual ranked search result; and assign a raised ranking, but not a highest ranking, to the individual ranked search result when some of the first character set characters in the search string match with first character set characters in the individual ranked search result.

20. The system of claim 19, comprising further instructions that, when executed by the processor circuitry, cause the system to re-rank the ranked search results based on the ranking of the one or more ranked search results.

21. The system of claim 20, comprising further instructions that, when executed by the processor circuitry, cause the system to return the re-ranked individual ranked search results to a requesting device.

* * * * *